(12) United States Patent
Takagi et al.

(10) Patent No.: US 10,862,326 B2
(45) Date of Patent: Dec. 8, 2020

(54) CHARGE CONTROL DEVICE FOR IN-VEHICLE BATTERY

(71) Applicant: TOYOTA JIDOSHA KABUSHIKI KAISHA, Toyota (JP)

(72) Inventors: Masaru Takagi, Toyota (JP); Nobuyuki Yamazaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 15/915,672

(22) Filed: Mar. 8, 2018

(65) Prior Publication Data
US 2018/0264956 A1  Sep. 20, 2018

(30) Foreign Application Priority Data
Mar. 17, 2017 (JP) .................. 2017-053024

(51) Int. Cl.
| | |
|---|---|
| H02J 7/00 | (2006.01) |
| B60L 11/18 | (2006.01) |
| B60L 53/62 | (2019.01) |
| B60L 53/22 | (2019.01) |
| B60L 3/00 | (2019.01) |
| B60L 53/14 | (2019.01) |
| B60L 58/13 | (2019.01) |
| B60L 58/15 | (2019.01) |

(52) U.S. Cl.
CPC ........ *H02J 7/00712* (2020.01); *B60L 3/0046* (2013.01); *B60L 11/1812* (2013.01); *B60L 53/14* (2019.02); *B60L 53/22* (2019.02); *B60L 53/62* (2019.02); *B60L 58/13* (2019.02); *B60L 58/15* (2019.02); *H02J 7/0034* (2013.01); *H02J 7/0068* (2013.01); *H02J 7/0077* (2013.01); *H02J 7/0091* (2013.01); *B60L 2240/36* (2013.01); *B60L 2240/545* (2013.01); *B60L 2240/547* (2013.01); *B60L 2240/549* (2013.01); *H02J 7/00304* (2020.01); *Y02T 10/70* (2013.01)

(58) Field of Classification Search
CPC ........................................ H02J 7/00
See application file for complete search history.

(56) References Cited

U.S. PATENT DOCUMENTS

| | | | |
|---|---|---|---|
| 2005/0110498 A1* | 5/2005 | Plett .................. | G01R 31/3648 324/433 |
| 2011/0127958 A1 | 6/2011 | Ishishita et al. | |
| 2012/0215472 A1 | 8/2012 | Tezuka et al. | |
| 2016/0020618 A1* | 1/2016 | Yang ..................... | H02J 7/045 320/162 |

FOREIGN PATENT DOCUMENTS

| | | |
|---|---|---|
| JP | 2011-222343 A | 11/2011 |
| JP | 2015-225846 A | 12/2015 |
| WO | 2010/005079 A1 | 1/2010 |

\* cited by examiner

*Primary Examiner* — Robert Grant
(74) *Attorney, Agent, or Firm* — Sughrue Mion, PLLC (57) ABSTRACT

A charge control device for an in-vehicle battery includes a control unit that obtains a neglect resistance increase rate as a reversible resistance component based on an SOC of the battery and a temperature of the battery when the battery is not charged/discharged, and that obtains a permissible charge current value to the battery based on the obtained neglect resistance increase rate.

6 Claims, 5 Drawing Sheets

FIG. 5

CHARGE CONTROL DEVICE FOR IN-VEHICLE BATTERY

INCORPORATION BY REFERENCE

The disclosure of Japanese Patent Application No. 2017-053024 filed on Mar. 17, 2017 including the specification, drawings and abstract is incorporated herein by reference in its entirety.

BACKGROUND

1. Technical Field

The disclosure relates to a charge control device for an in-vehicle battery for performing charge control of a battery that is mounted in a vehicle and that is configured as a lithium-ion secondary battery.

2. Description of Related Art

A vehicle that employs a rotating electrical machine as a drive source, such as an electric vehicle, a hybrid vehicle or the like is mounted with a battery as a DC electric power supply. The battery has a plurality of battery cells (electric cells) that are connected to one another.

It has been conventionally known that lithium may be precipitated on the surface of a negative electrode through large-current charge in the case where the battery is configured as a lithium-ion secondary battery. For example, while the potential of a positive electrode rises due to charge, the potential of the negative electrode falls (increases toward the negative side), so the difference between the potentials widens. When the potential of the negative electrode falls below a reference potential (e.g., 0 (V)) as a result of the progress of charge, lithium is precipitated on the surface of the negative electrode. Upon growing to be arborized (to become dendritic), a precipitate of lithium may penetrate a separator that separates the positive electrode and the negative electrode from each other. Therefore, charge control (input current control) for restraining lithium from being precipitated has been conventionally performed.

For example, in Japanese Patent Application Publication No. 2015-225846 (JP 2015-225846 A), when a limit value of an input current (a charge current) of a battery is calculated, a stress applied to an electrode is measured, and an internal resistance is calculated from the measured value. Furthermore, the limit value of the input current is set based on the internal resistance. For example, a precipitation limit current value Ilim is obtained from an internal resistance r and a precipitation potential V0.

Besides, in Japanese Patent Application Publication No. 2011-222343 (JP 2011-222343 A), a determination on the degree of precipitation of lithium is made based on the degree of aged deterioration of the battery. In concrete terms, a determination on the degree of precipitation of lithium is made from a difference between an amount of fall in discharge of a lithium battery and an amount of secular fall in discharge resulting from aged deterioration.

SUMMARY

By the way, deteriorations of the battery as a factor for boosting up the internal resistance are classified into an irreversible (i.e., difficult to eliminate) deterioration and a reversible (i.e., capable of being eliminated) deterioration.

Aged deterioration can be mentioned as an example of the former. Neglect deterioration can be mentioned as an example of the latter.

Neglect deterioration means a phenomenon of a (temporary) deterioration, especially an increase in the resistance of the negative electrode at the time when the battery is neglected without being charged/discharged. On the other hand, it is known that neglect deterioration is eliminated when the battery is charged/discharged.

If, as in conventional cases, the input current limit value is set in consideration of only irreversible deteriorations such as aged deterioration and the like, namely, in disregard of neglect deterioration, the internal resistance of the battery is estimated to be lower than an actual value. As a result, the input current limit value is set higher (with loose restrictions) than the precipitation limit current value Ilim based on an actual internal resistance (i.e., an internal resistance including a neglect deterioration component), and may lead to the precipitation of lithium.

Thus, the disclosure provides a charge control device for an in-vehicle battery that can perform charge current control reflecting a state of neglect deterioration as a reversible deterioration.

A charge control device for an in-vehicle battery according to a first aspect of the disclosure performs charge control of a battery that is mounted in a vehicle and that is configured as a lithium-ion secondary battery. The charge control device includes a control unit that is configured to obtain a neglect resistance increase rate as a reversible resistance component based on an SOC of the battery and a temperature of the battery when the battery is not charged/discharged, and obtain a permissible charge current value to the battery based on the obtained neglect resistance increase rate.

Besides, in the aforementioned aspect of the disclosure, the control unit may be configured to obtain a neglect resistance elimination rate based on a difference in SOC resulting from charge/discharge of the battery and a temperature of the battery when the battery is charged/discharged, and the control unit may correct the neglect resistance increase rate based on the neglect resistance elimination rate.

By obtaining the eliminated neglect resistance based on the charge/discharge of the battery, the neglect resistance as the reversible resistance component can be more accurately obtained.

Besides, in the aforementioned aspect of the disclosure, the control unit may be configured to store a first corresponding relationship indicating how the SOC of the battery and the temperature of the battery are related to the neglect resistance increase rate, the control unit may be configured to refer to the first corresponding relationship in obtaining the neglect resistance increase rate, and the first corresponding relationship may be determined such that the neglect resistance increase rate becomes higher than in a state that is different in at least one of the SOC and the temperature from a first state where the SOC of the battery is confined within a predetermined high SOC region or a predetermined low SOC region and the temperature of the battery is confined within a predetermined first high temperature region, when the first state is established.

According to the knowledge of the inventors, it has turned out that the neglect resistance becomes relatively high when the state of the battery is in the high SOC region or the low SOC region and in the high temperature range. The neglect resistance can be accurately obtained based on this corresponding relationship.

Besides, in the aforementioned configuration, the control unit may be configured to store a second corresponding relationship indicating how the difference in SOC of the battery and the temperature of the battery are related to the neglect resistance elimination rate, the control unit may be configured to refer to the second corresponding relationship in obtaining the neglect resistance elimination rate, and the second corresponding relationship may be determined such that the neglect resistance elimination rate becomes higher than in a state that is different in at least one of the difference in SOC and the temperature from a second state where the difference in SOC of the battery is confined within a predetermined high SOC difference region and the temperature of the battery is confined within a predetermined second high temperature region, when the second state is established.

According to the knowledge of the inventors, it has turned out that the elimination rate of the neglect resistance becomes relatively high when the difference in SOC of the battery is in the high SOC difference region and the temperature of the battery is in the high temperature range. The neglect resistance can be accurately obtained based on this corresponding relationship.

A charge control device for an in-vehicle battery according to a second aspect of the disclosure performs charge control of a battery that is mounted in a vehicle and that is configured as a lithium-ion secondary battery. The charge control device includes a neglect resistance increase rate calculation unit that is configured to obtain a neglect resistance increase rate as a reversible resistance component based on an SOC of the battery and a temperature of the battery, when the battery is not charged/discharged, and a permissible charge current value calculation unit that is configured to obtain a permissible charge current value to the battery, based on the obtained neglect resistance increase rate.

Besides, in the aforementioned aspect of the disclosure, the charge control device may be further equipped with a neglect resistance elimination rate calculation unit that is configured to obtain a neglect resistance elimination rate based on a difference in SOC of the battery resulting from charge/discharge of the battery and a temperature of the battery when the battery is charged/discharged, and the permissible charge current value calculation unit may be configured to correct the neglect resistance increase rate based on the neglect resistance elimination rate.

By obtaining the eliminated neglect resistance based on the charge/discharge of the battery, the neglect resistance as the reversible resistance component can be more accurately obtained.

Besides, in the aforementioned aspect of the disclosure, the charge control device may be further equipped with a neglect resistance increase rate storage unit that is configured to store a first corresponding relationship indicating how the SOC of the battery and the temperature of the battery are related to the neglect resistance increase rate, the first corresponding relationship being referred to by the neglect resistance increase rate calculation unit in obtaining the neglect resistance increase rate, and the first corresponding relationship may be determined such that the neglect resistance increase rate becomes higher than in a state that is different in at least one of the SOC of the battery and the temperature of the battery from a first state where the SOC of the battery is confined within a predetermined high SOC region or a predetermined low SOC region and the temperature of the battery is confined within a predetermined first high temperature region, when the first state is established.

According to the knowledge of the inventors, it has turned out that the neglect resistance becomes relatively high when the state of the battery is in the high SOC region or the low SOC region and in the high temperature region. The neglect resistance can be accurately obtained based on this corresponding relationship.

Besides, in the aforementioned configuration, the charge control device may be further equipped with a neglect resistance elimination rate storage unit that is configured to store a second corresponding relationship indicating how the difference in the SOC of the battery and the temperature of the battery are related to the neglect resistance elimination rate, the second corresponding relationship being referred to by the neglect resistance elimination rate calculation unit in obtaining the neglect resistance elimination rate, and the second corresponding relationship may be determined such that the neglect resistance elimination rate becomes higher than in a state that is different in at least one of the difference in SOC of the battery and the temperature of the battery from a second state where the difference in SOC of the battery is confined within a predetermined high SOC difference region and the temperature of the battery is confined within a predetermined second high temperature region, when the second state is established.

According to the knowledge of the inventors, it has turned out that the neglect resistance elimination rate becomes relatively high when the difference in SOC of the battery is in the high SOC difference region and the temperature of the battery is in the high temperature region. The neglect resistance can be accurately obtained based on this corresponding relationship.

The aforementioned first aspect of the disclosure and the aforementioned second aspect of the disclosure make it possible to perform charge current control reflecting a state of neglect deterioration as a reversible deterioration.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
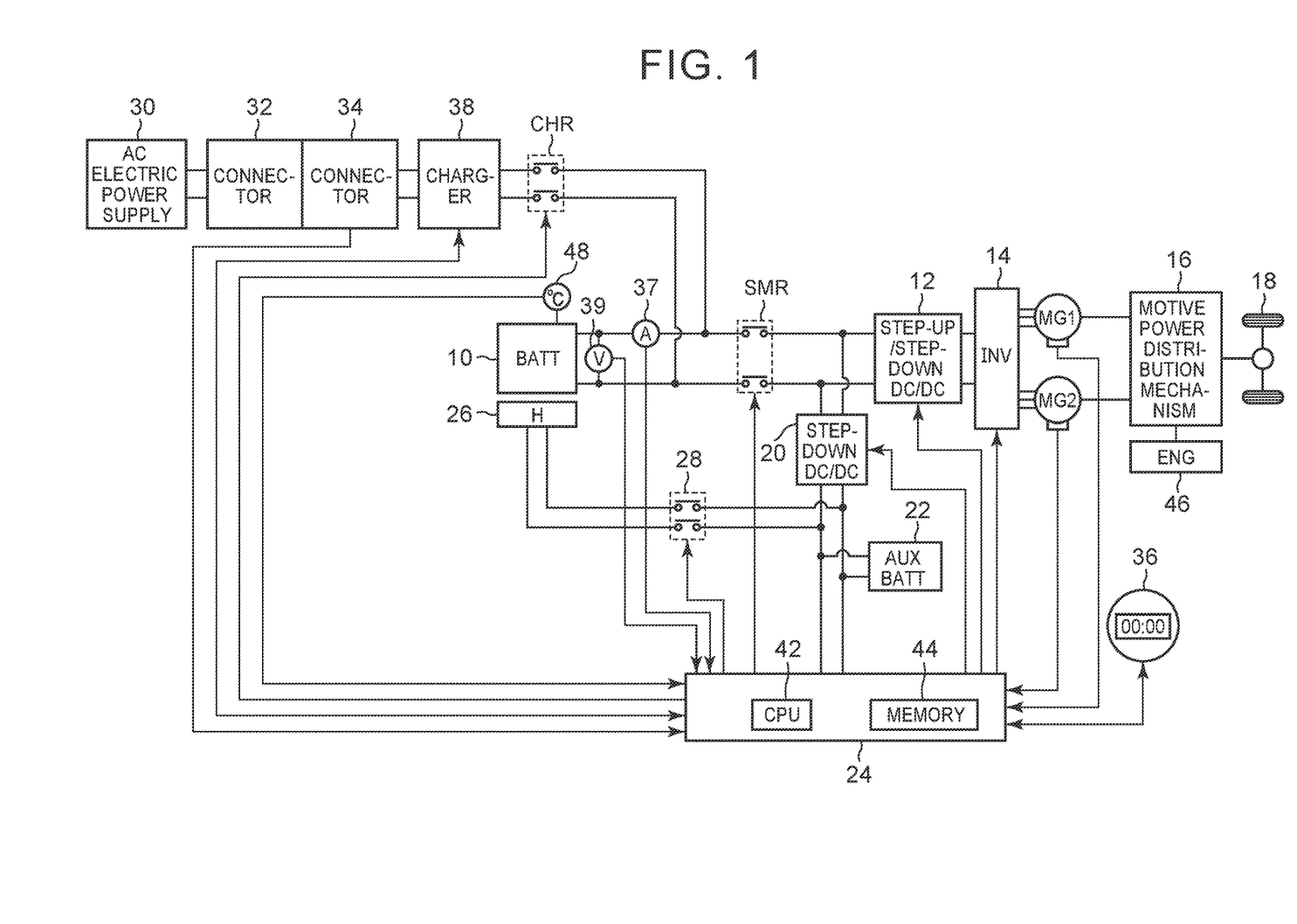
FIG. 1 is a view exemplifying the configuration of a charge control device for an in-vehicle battery according to the present embodiment of the disclosure, and the configuration of a vehicle that is mounted with this charge control device.
Figure 2:
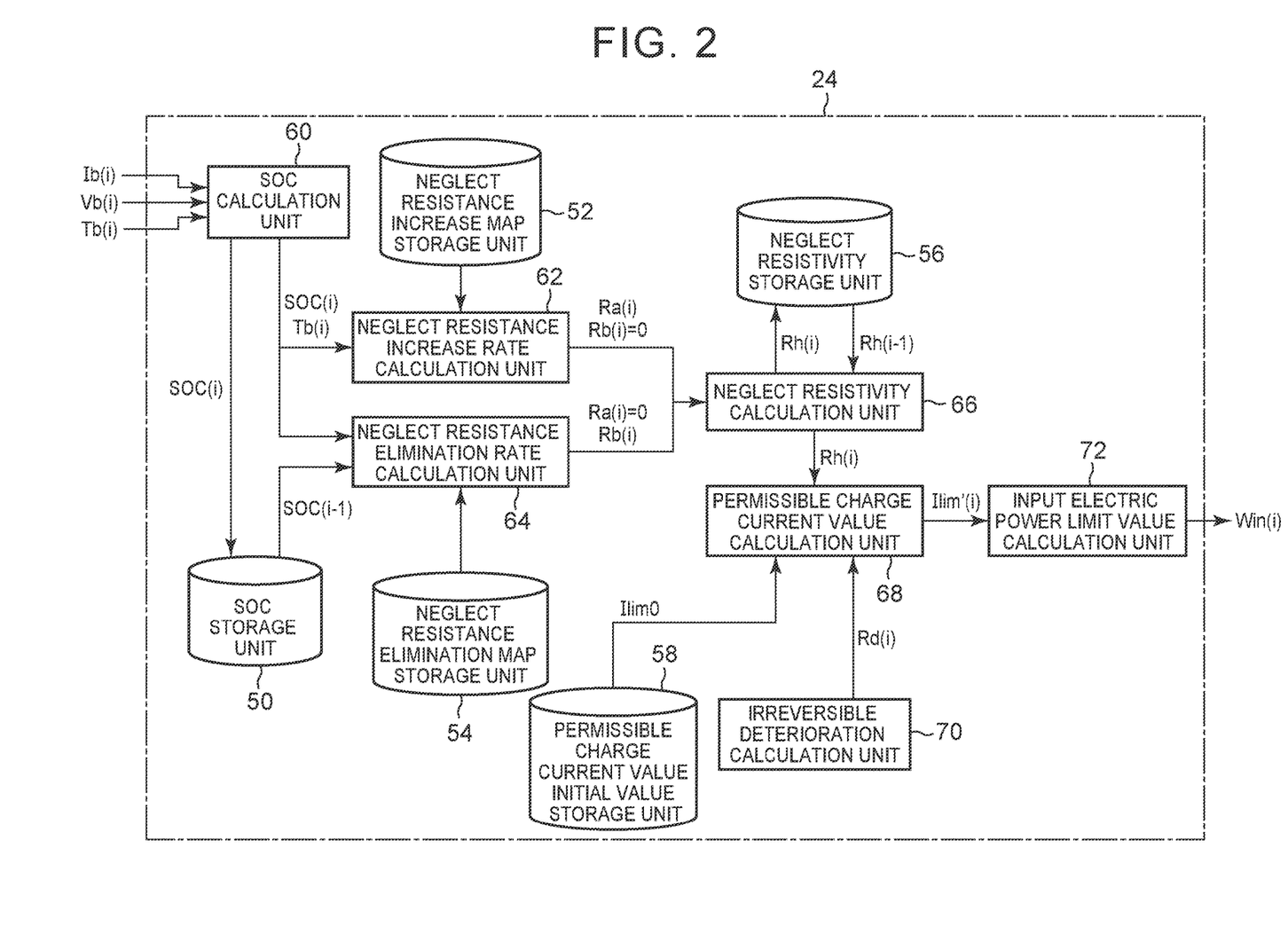
FIG. 2 is a view exemplifying functional blocks of a control unit.

FIG. 1 exemplifies the configuration of a charge control device for an in-vehicle battery according to the present embodiment of the disclosure, and the configuration of a vehicle that is mounted with this device. Incidentally, for the sake of simple illustration, the configuration that is not very relevant to the charge control device according to the present embodiment of the disclosure is appropriately omitted in FIG. 1. Besides, arrows in FIGS. 1 and 2 represent signal lines respectively.

Besides, the vehicle shown in FIG. 1 is a plug-in hybrid vehicle, but is not limited thereto. In short, the vehicle shown in FIG. 1 may be any vehicle that is mounted with an electric power supply (a battery) for a drive source and that is equipped with a mechanism capable of charging the battery. For example, a hybrid vehicle, an electric vehicle or the like may be mounted with the charge control device according to the present embodiment of the disclosure.

A main battery 10 that is mounted in the vehicle is configured as a lithium-ion secondary battery. For example, the main battery 10 is configured as a stack (a laminated body) that is obtained by laminating a plurality of lithium-ion secondary battery cells (electric cells) of about 1 to 5 V on one another.

A DC electric power output from the main battery 10 is stepped up by a step-up/step-down DC/DC converter 12. The stepped-up DC electric power is subjected to DC/AC conversion (DC→AC) by an inverter 14. An AC electric power obtained after conversion is supplied to at least one of rotating electrical machines MG1 and MG2. Furthermore, a motive power is transmitted to wheels 18 from the rotating electrical machines MG1 and MG2 respectively via a motive power distribution mechanism 16.

Besides, there is provided a branch electric path that branches off from an electric path linking the main battery 10 and the step-up/step-down DC/DC converter 12 with each other and that is connected to a step-down DC/DC converter 20. A high-voltage electric power of the main battery 10 is stepped down by the step-down DC/DC converter 20, and is supplied to a subsidiary battery 22, a control unit 24, and other auxiliaries.

It should be noted herein that regenerative braking, electric power generation by the rotating electrical machine MG1, and external charge are carried out as means for charging the main battery 10, in the vehicle shown in FIG. 1.

In regeneratively braking the vehicle, a regenerative electric power of the rotating electrical machine MG2 is subjected to AC/DC conversion (AC→DC) by the inverter 14, is further stepped down by the step-up/step-down DC/DC converter 12, and is supplied to the main battery 10.

Besides, when a state of charge (SOC) of the main battery 10 is confined within a predetermined low SOC region, an internal combustion engine 46 drives the rotating electrical machine MG1 in such a manner to generate an electric power. The electric power generated by the rotating electrical machine MG1 is subjected to AC/DC conversion, is further stepped down by the step-up/step-down DC/DC converter 12, and is supplied to the main battery 10.

In addition, the plug-in hybrid vehicle exemplified in FIG. 1 allows the main battery 10 to be charged (external charge or plug-in charge) from an AC electric power supply 30 outside the vehicle (the external electric power supply). Incidentally, the AC electric power supply 30 is, for example, a single-phase 100-V AC electric power supply or single-phase 200-V AC electric power supply for domestic use.

In carrying out external charge, a connector 32 (a plug) of the AC electric power supply 30 is connected to a connector 34 (an inlet) with which the vehicle is provided. When external charge is started, namely, when a charge relay CHR in its off state is turned on by the control unit 24, an AC electric power supplied from the AC electric power supply 30 is subjected to AC/DC conversion and stepped up by the charger 38, and a DC electric power obtained after converting and stepping up the AC electric power is supplied to the main battery 10.

This regenerative braking, this electric power generation by the rotating electrical machine MG1, and this charge of the main battery 10 through external charge are controlled by the control unit 24 and other electronic control units. In concrete terms, the operations of respective components, namely, the inverter 14, the step-up/step-down DC/DC converter 12, the rotating electrical machine MG1, and the charger 38 are controlled based on an input electric power limit value Win that will be described later. As a result, the main battery 10 is prevented from being overcharged. Besides, lithium is restrained from being precipitated at a negative electrode of the main battery 10.

The charge control device according to the present embodiment of the disclosure is equipped with the control unit 24, a current sensor 37, and a temperature sensor 48.

The control unit 24 performs charge/discharge control of the main battery 10. The control unit 24 is configured as, for example, a computer, and is equipped with a CPU 42 as an arithmetic circuit and a storage unit 44. The storage unit 44 is configured to include a volatile memory such as an SRAM or the like, and a non-volatile memory such as a ROM, a hard disk or the like. A program for executing the later-described flow for calculating an input electric power limit value is stored in the storage unit 44.

A functional unit shown in FIG. 2 is produced in the control unit 24, through the execution of an input electric power limit value calculation program stored in the storage unit 44 by the CPU 42. This functional unit is produced through, for example, allocation of resources such as the CPU 42, the storage unit 44 and the like, and is virtually shown as functional blocks that are independent of one another.

In concrete terms, the control unit 24 is equipped with an SOC calculation unit 60, a neglect resistance increase rate calculation unit 62, a neglect resistance elimination rate calculation unit 64, a neglect resistivity calculation unit 66, a permissible charge current value calculation unit 68, an irreversible deterioration calculation unit 70, and an input electric power limit value calculation unit 72. Besides, the control unit 24 is equipped with an SOC storage unit 50, a neglect resistance increase rate map storage unit 52, a neglect resistance elimination rate map storage unit 54, a neglect resistivity storage unit 56, and a permissible charge current initial value storage unit 58 as storage units.

In the following description, as appropriate, by using a symbol Ra denoting a neglect resistance increase rate, the neglect resistance increase rate calculation unit 62 will be referred to as an Ra calculation unit 62. Besides, by using a symbol Rb denoting a neglect resistance elimination rate, the neglect resistance elimination rate calculation unit 64 will be referred to as an Rb calculation unit 64. Furthermore, by using a symbol Rh denoting a neglect resistivity, the neglect resistivity calculation unit 66 will be referred to as an Rh calculation unit 66. Besides, by using a symbol Rd denoting a resistance component resulting from an irreversible deterioration, the irreversible deterioration calculation unit 70 will be referred to as an Rd calculation unit 70. Besides, by using a symbol Win denoting an input electric power limit value, the input electric power limit value calculation unit 72 will be referred to as a Win calculation unit 72.

Besides, by the same token, the neglect resistance increase rate map storage unit 52 will be referred to as an Ra map storage unit 52, the neglect resistance elimination rate map storage unit 54 will be referred to as an Rb map storage unit 54, and the neglect resistivity storage unit 56 will be referred to as an Rh storage unit 56. Furthermore, by using a symbol Ilim0 denoting a permissible charge current initial value, the permissible charge current initial value storage unit 58 will be referred to as an Ilim0 storage unit 58.

The operations of the respective functional units of the above-mentioned control unit 24 will be described using a functional block diagram of FIG. 2 and the flow of calculating an input electric power limit value (the Win calculation flow) shown in FIG. 3. Incidentally, in the flow of calculating the input electric power limit value shown in FIG. 3, an increase in neglect resistance and a process of eliminating the neglect resistance are sequentially calculated. Thus, for example, in the flow of FIG. 3, a start time point is defined as a time point when the main battery 10 that has not been energized yet (that is brand-new) is mounted in the vehicle, and an end time point is defined as a time point when the main battery 10 is replaced due to a deterioration thereof.

In the flow of calculating the input electric power limit value, the input electric power limit value Win is set from the standpoint of restraining lithium from being precipitated in the main battery 10. As described above, when the potential of the negative electrode of the lithium-ion battery falls below a precipitation reference potential V0, lithium is precipitated in the negative electrode.

A permissible charge current value Ilim as an upper limit of a charge current is obtained from the precipitation reference potential V0 and an internal resistance r of the main battery 10. For example, V0/r=Ilim. The precipitation reference potential V0 is stored in advance in the storage unit 44 as a known value. The internal resistance r fluctuates in accordance with a degree of aged deterioration of the main battery 10 and a degree of neglect deterioration of the main battery 10. In the present embodiment of the disclosure, the internal resistance r is accurately obtained by obtaining this fluctuant degree of aged deterioration and this fluctuant degree of neglect deterioration.

The neglect deterioration is a reversible deterioration (i.e., that can be eliminated). When the main battery 10 is neglected without being charged/discharged, the resistance of the negative electrode increases in particular. For example, as a result of neglecting the main battery 10, a coat is formed on the surface of the negative electrode, and the exchange of substances (lithium and lithium ions) between the negative electrode and an electrolyte is hindered. On the other hand, when the main battery 10 is charged/discharged, the neglect deterioration is eliminated. For example, as a result of charge/discharge, the coat formed on the surface of the negative electrode is eliminated (dissolved).

It has been revealed, as a result of the studies and the like conducted by the inventors, that this neglect deterioration especially remarkably occurs, for example, when an Ni-type material is used as an active material for a positive electrode and the negative electrode is highly-condensed in a lithium-ion secondary battery.

Figure 3:
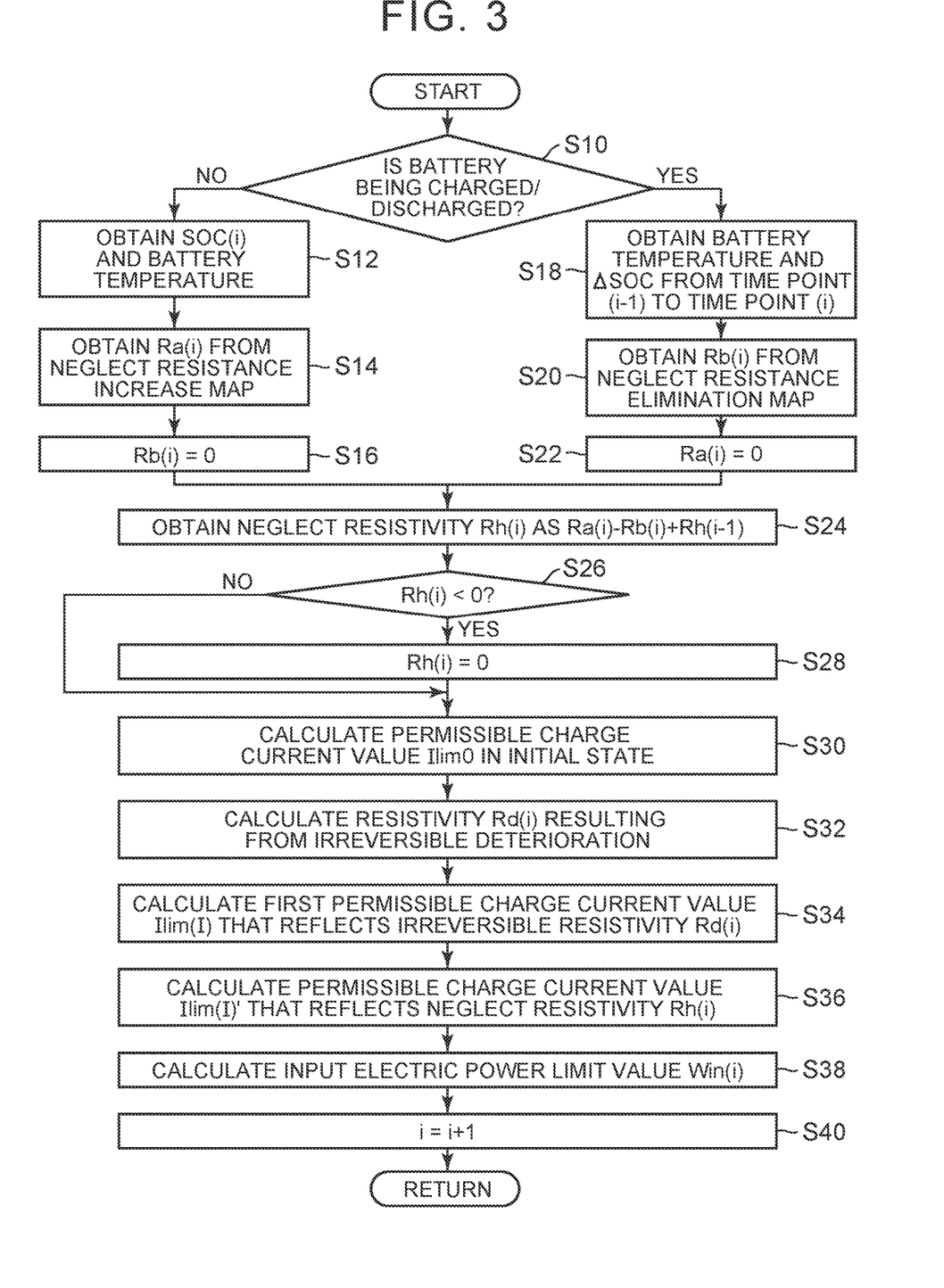
FIG. 3 is a view exemplifying the flow of calculating an input electric power limit value.

Referring to FIGS. 2 and 3, the SOC calculation unit 60 detects, from the current sensor 37, a current Ib caused to flow out from/into the main battery 10, and determines whether or not the main battery 10 is being charged/discharged (S10). That is, it is determined whether or not the neglect resistivity Rh increases or is eliminated in this case. For example, if a current value Ib(i) detected by the current sensor 37 at a time point i is confined within a predetermined threshold range (e.g., a range from −0.1 A to 0.1 A), it is determined that the main battery 10 is not being charged/ discharged (is neglected). If the current value detected by the current sensor 37 is outside the aforementioned predetermined threshold range, it is determined that the main battery 10 is being charged/discharged.

If it is determined that the main battery 10 is in the former state (is neglected), the SOC calculation unit 60 obtains an SOC(i) of the main battery 10 at the present time point i and a temperature Tb(i) of the main battery 10 at the present time point (i) (S12). The SOC(i) may be obtained based on, for example, an integrated value of a current value detected by the current sensor 37. Besides, the SOC(i) obtained through integration of the current may be appropriately corrected using a voltage Vb(i) (a voltage between terminals) of the main battery 10 detected by the voltage sensor 39 and the temperature Tb(i) of the main battery 10. These methods of calculating the SOC are known, so detailed description thereof will be omitted.

The SOC calculation unit 60 transmits the SOC(i) and the main battery temperature Tb(i) to the Ra calculation unit 62. Besides, the SOC calculation unit 60 transmits the SOC(i) to the SOC storage unit 50. The Ra calculation unit 62 calculates a neglect resistance increase rate Ra(i) based on the received SOC(i) and Tb(i) and the neglect resistance increase rate map (S14).

Figure 4:
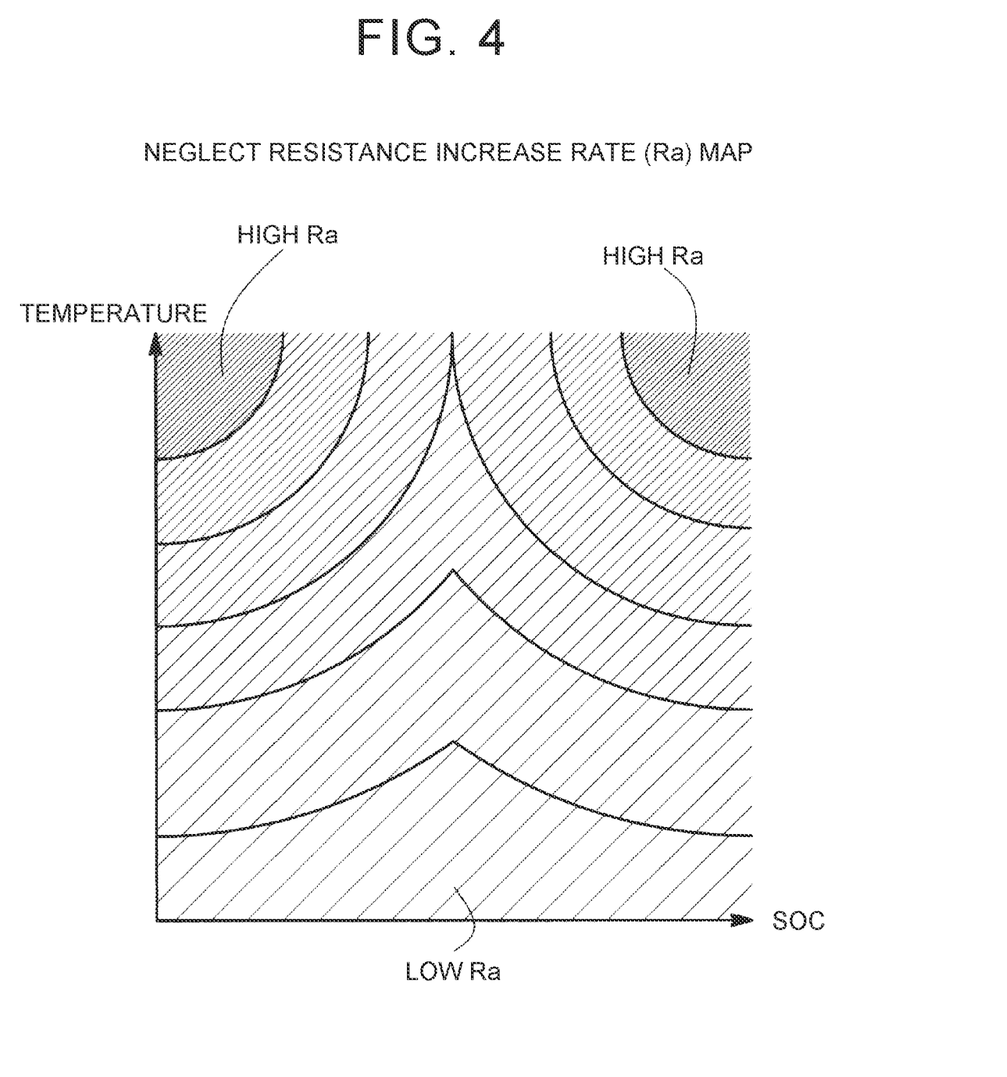
FIG. 4 is a view exemplifying a neglect resistance increase rate map.

The neglect resistance increase rate map (the Ra map) is stored in the Ra map storage unit 52, and is referred to (invoked) by the Ra calculation unit 62 in calculating the neglect resistance increase rate Ra(i). FIG. 4 exemplifies the Ra map. The axis of abscissa represents the SOC of the main battery 10, and the axis of ordinate represents the temperature of the main battery 10.

The inventors have found out, as the characteristics of the neglect resistance, that the neglect resistance increases (the rate of increase rises) as the SOC falls and as the temperature rises. Besides, the inventors have also found out that the neglect resistance increases (the rate of increase rises) as the SOC rises and as the temperature rises. In the Ra map, this corresponding relationship (the first corresponding relationship) indicating how the SOC and the temperature are related to the neglect resistance increase rate Ra is mapped (graphically represented).

For example, in FIG. 4, the neglect resistance increase rate Ra rises as the density of hatching increases. For example, the Ra map (the first corresponding relationship) is created such that the neglect resistance increase rate Ra becomes higher than in a state that is different in the SOC and the temperature Tb from a state (the first state) where the SOC of the main battery 10 is confined within a predetermined low SOC region (e.g., the SOC is equal to or lower than 30%) or a predetermined high SOC region (e.g., the SOC is equal to or higher than 70%) and the temperature Tb of the main battery 10 is confined within a predetermined high temperature region (e.g., equal to or higher than 40° C.), when the first state is established. By assigning the SOC(i) and Tb(i) obtained in step S12 to the Ra map, the neglect resistance increase rate Ra(i) corresponding to these values is obtained.

Subsequently, the Ra calculation unit 62 sets the neglect resistance elimination rate Rb(i) to 0 (S16), and transmits this value and the neglect resistance increase rate Ra(i) to the Rh calculation unit 66.

Back in step S10, if it is determined that the main battery 10 is being charged/discharged, the neglect resistance elimination rate Rb(i) is calculated. The SOC calculation unit 60 transmits the SOC(i) and temperature Tb(i) of the main battery 10 at the time point i to the Rb calculation unit 64. Besides, the SOC calculation unit 60 transmits the SOC(i) to the SOC storage unit 50.

The Rb calculation unit 64 obtains a difference in SOC resulting from charge/discharge, namely, a difference ΔSOC(i) between SOC(i) at the time point i and SOC(i−1) at a preceding time point i−1 (S18). SOC(i−1) is obtained from the SOC storage unit 50. Furthermore, the Rb calculation unit 64 obtains a neglect resistance elimination rate Rb(i) based on ΔSOC(i), the temperature Tb(i), and a neglect resistance elimination rate map (an Rb map) (S20).

Figure 5:
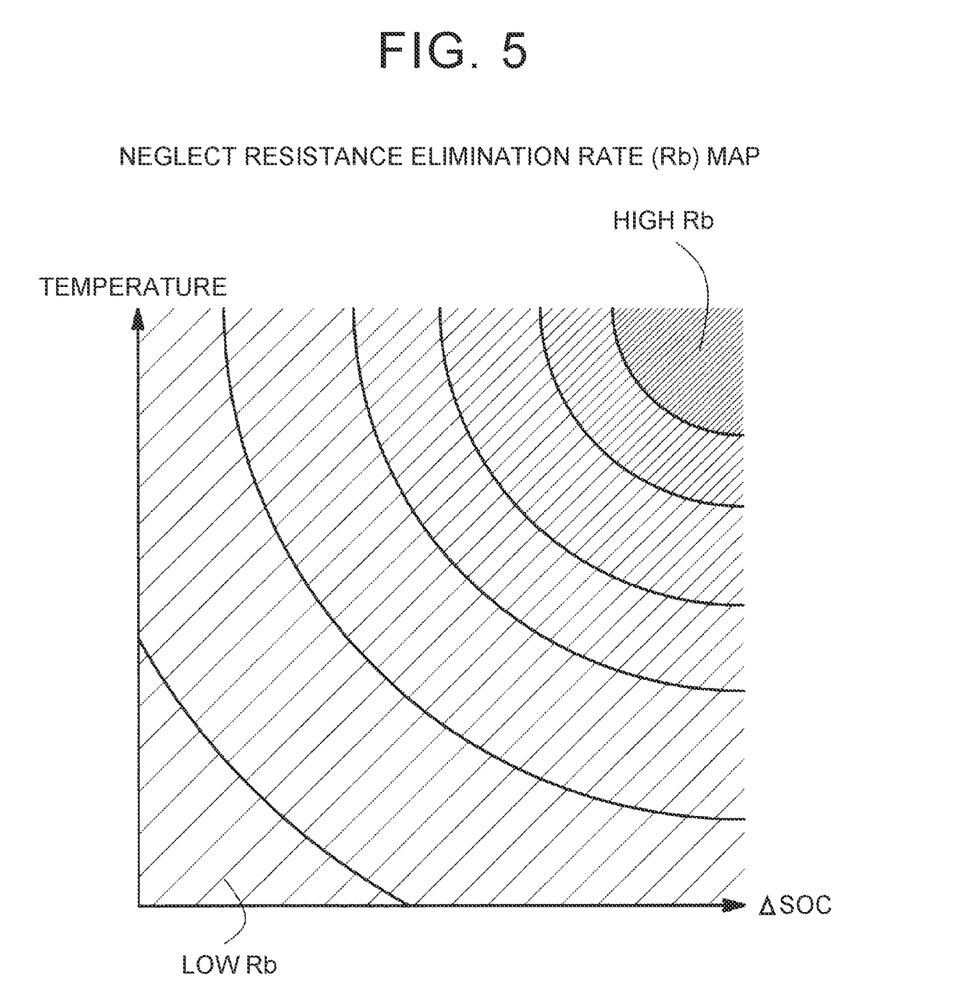
FIG. 5 is a view exemplifying a neglect resistance elimination rate map.

The Rb map is stored in the Rb storage unit 54, and is referred to (invoked) by the Rb calculation unit 64 in calculating the neglect resistance elimination rate Rb(i). FIG. 5 exemplifies the Rb map. The axis of abscissa represents ΔSOC, namely, the difference in SOC of the main battery 10, and the axis of ordinate represents the temperature Tb of the main battery 10.

The inventors have found out, as the characteristics of the neglect resistance, that the elimination of the neglect resistance progresses (the elimination rate rises) as the difference ΔSOC rises and as the temperature rises. In the Rb map, this corresponding relationship indicating how the difference ΔSOC and the temperature Tb are related to the neglect resistance elimination rate Rb (the second corresponding relationship) is mapped (graphically represented).

For example in FIG. 5, the neglect resistance elimination rate Rb rises as the density of hatching increases. For example, the Rb map (the second corresponding relationship) is created such that the neglect resistance elimination rate Rb becomes higher than in a state that is different in the difference ΔSOC and the temperature Tb from a state (the second state) where the difference ΔSOC of the main battery 10 is confined within a predetermined high ΔSOC region (e.g., the difference ΔSOC is equal to or higher than 70%) and the temperature Tb of the main battery 10 is confined within a predetermined high temperature region (e.g., equal to or higher than 40° C.), when the second state is established. By assigning the difference ΔSOC(i) obtained in step S18 and the temperature Tb(i) obtained in step S18 to the Rb map, the neglect resistance elimination rate Rb(i) corresponding to these values is obtained.

Subsequently, the Rb calculation unit 64 sets the neglect resistance increase rate Ra(i) to 0 (S22), and transmits this value and the neglect resistance elimination rate Rb(i) to the Rh calculation unit 66.

The Rh calculation unit 66 obtains a neglect resistivity Rh(i) at the time point i from the neglect resistance increase rate Ra(i) and neglect resistance elimination rate Rb(i)=0 acquired from the Ra calculation unit 62 or the neglect resistance elimination rate Rb(i) and neglect resistance increase rate Ra(i)=0 acquired from the Rb calculation unit 64, and the last value Rh(i−1) (S24). The Rh calculation unit 66 acquires the last value Rh(i−1) of the neglect resistivity from the Rh storage unit 56.

In calculating the neglect resistivity Rh(i), the Rh calculation unit 66 adds the neglect resistance increase rate Ra(i) to the last value Rh(i−1) of the neglect resistivity, and substracts the neglect resistance elimination rate Rb(i) therefrom. As described hitherto, in the present embodiment of the disclosure, the neglect resistivity is corrected (reduced) by the neglect resistance elimination rate Rb(i) instead of only adding the increase rate Ra(i), as to the neglect resistance as a reversible resistance component.

Subsequently, the Rh calculation unit 66 determines whether or not the obtained neglect resistivity Rh(i) is a negative value (S26). If the neglect resistivity Rh(i) is a negative value, the following calculation may be hindered, so the Rh calculation unit 66 makes Rh(i) equal to 0 instead of using the obtained neglect resistivity Rh(i) (S28). Furthermore, the changed Rh(i)=0 is transmitted to the Rh storage unit 56 and the permissible charge current value calculation unit 68. If the neglect resistivity Rh(i) is a value equal to or larger than 0, this neglect resistivity Rh(i) is transmitted to the Rh storage unit 56 and the permissible charge current value calculation unit 68.

The permissible charge current value calculation unit 68 obtains a permissible charge current value to the main battery 10, based on the neglect resistivity Rh(i) (including the neglect resistance increase rate Ra(i)). First of all, the permissible charge current value calculation unit 68 acquires the permissible charge current value Ilim0 in an initial state (a brand-new state before energization) of the main battery 10, from the Ilim0 storage unit 58 (S30). The initial value Ilim0 of the permissible charge current value can be obtained from, for example, the specification or the like of the main battery 10.

Besides, at this time, the Rd calculation unit 70 calculates a resistivity Rd(i) resulting from an irreversible deterioration at the time point i (S32). For example, the Rd calculation unit 70 calculates an internal resistance component resulting from aged deterioration. The method of calculating the resistance component based on this irreversible deterioration is known, so description thereof will be omitted herein.

The permissible charge current value calculation unit 68 corrects the initial value Ilim0 of the permissible charge current value based on an irreversible deterioration resistivity Rd(i), and regards this corrected value as a first permissible charge current value Ilim(i) (S34). For example, the permissible charge current value calculation unit 68 multiplies the initial value Ilim0 by a decrease rate β1 corresponding to an increase rate α1 at the time when the irreversible deterioration resistivity Rd(i) is added to the initial value of the internal resistance used in calculating the initial value Ilim0 of the permissible charge current value, and regards this value as the first permissible charge current value Ilim(i).

The increase rate α1 is obtained from, for example, (the internal resistance initial value+the irreversible deterioration resistivity)/the internal resistance initial value. The decrease rate β1 is obtained from, for example, 1/α1.

Furthermore, the permissible charge current value calculation unit 68 calculates a permissible charge current value Ilim(i)' by correcting the first permissible charge current value Ilim(i) based on the neglect resistivity Rh(i) (S36). For example, the permissible charge current value calculation unit 68 multiplies the first permissible charge current value Ilim(i) by a decrease rate β2 corresponding to an increase rate α2 at the time when the neglect resistivity Rh(i) is added to the internal resistance (the internal resistance initial value+the irreversible deterioration resistivity Rd(i)) used in calculating the first permissible charge current value Ilim(i), and regards this value as the permissible charge current value Ilim(i)'.

It should be noted herein that the increase rate α2 is obtained from, for example, (the internal resistance initial value+the irreversible deterioration resistivity+the neglect resistivity)/(the internal resistance initial value+the irreversible deterioration resistivity). Besides, the decrease rate β2 is obtained from 1/α2.

The obtained permissible charge current value Ilim(i)' is sent to the Win calculation unit 72. The Win calculation unit 72 calculates an input electric power limit value Win(i) based on the permissible charge current value Ilim(i)' (S38).

For example, the product of the permissible charge current value Ilim(i)' and the voltage Vb of the main battery 10 is equal to the input electric power limit value Win(i). Driving force control of the vehicle uses the torque (N·m/sec) per time as a parameter in some cases. By using the electric power (W=N·m/sec), which is in the same unit system as the torque, as a parameter of driving force control, the arithmetic load such as unit conversion or the like is reduced.

The calculated input electric power limit value Win(i) is transmitted to a drive control unit (not shown). Furthermore, the count at the time point i is incremented (S40), and a return to step S10 is made again. For example, in the case where the system of the vehicle has been activated (e.g., the system main relay SMR or the charge relay CHR has been connected), the flow of FIG. 3 is repeated at intervals of a predetermined clock of the CPU 42 of the control unit 24. Besides, in the case where the system of the vehicle is in pause (e.g., the system main relay SMR and the charge relay CHR have been shut off), the control unit 24 is intermittently activated by a timer 36 (see FIG. 1). The flow of FIG. 3 is executed every time the control unit 24 is intermittently activated.

What is claimed is:

1. A charge control device for an in-vehicle battery, for performing charge control of a battery that is mounted in a vehicle and that is configured as a lithium-ion secondary battery, comprising:
   a control unit that is configured to obtain a neglect resistance increase rate as a reversible resistance component based on an SOC of the battery and a temperature of the battery when the battery is not charged/discharged, and obtain a permissible charge current value to the battery based on the obtained neglect resistance increase rate, wherein:
   the control unit is configured to obtain a neglect resistance elimination rate based on a difference in SOC resulting from charge/discharge of the battery and a temperature of the battery when the battery is charged/discharges; and
   the control unit is configured to correct the neglect resistance increase rate based on the neglect resistance elimination rate.

2. A charge control device for an in-vehicle battery, for performing charge control of a battery that is mounted in a vehicle and that is configured as a lithium-ion secondary battery, comprising:
   a control unit that is configured to obtain a neglect resistance increase rate as a reversible resistance component based on an SOC of the battery and a temperature of the battery when the battery is not charged/discharged, and obtain a permissible charge current value to the battery based on the obtained neglect resistance increase rate; wherein:
   the control unit is configured to store a first corresponding relationship indicating how the SOC of the battery and the temperature of the battery are related to the neglect resistance increase rate;
   the control unit is configured to refer to the first corresponding relationship in obtaining the neglect resistance increase rate; and
   the first corresponding relationship is determined such that the neglect resistance increase rate becomes higher than in a state that is different in at least one of the SOC and the temperature from a first state where the SOC of the battery is confined within a predetermined high SOC region or a predetermined low SOC region and the temperature of the battery is confined within a predetermined first high temperature region, when the first state is established.

3. The charge control device according to claim 1, wherein:
   the control unit is configured to store a second corresponding relationship indicating how the difference in SOC of the battery and the temperature of the battery are related to the neglect resistance elimination rate;
   the control unit is configured to refer to the second corresponding relationship in obtaining the neglect resistance elimination rate; and
   the second corresponding relationship is determined such that the neglect resistance elimination rate becomes higher than in a state that is different in at least one of the difference in SOC and the temperature from a second state where the difference in SOC of the battery is confined within a predetermined high SOC difference region and the temperature of the battery is confined within a predetermined second high temperature region, when the second state is established.

4. A charge control device for an in-vehicle battery, for performing charge control of a battery that is mounted in a vehicle and that is configured as a lithium-ion secondary battery, comprising:
   a neglect resistance increase rate calculation unit that is configured to obtain a neglect resistance increase rate as a reversible resistance component based on an SOC of the battery and a temperature of the battery, when the battery is not charged/discharged;
   a permissible charge current value calculation unit that is configured to obtain a permissible charge current value to the battery, based on the obtained neglect resistance increase rate, and
   a neglect resistance elimination rate calculation unit that is configured to obtain a neglect resistance elimination rate based on a difference in SOC of the battery resulting from charge/discharge of the battery and a temperature of the battery, when the battery is charge/discharged,
   wherein the permissible charge current value calculation unit is configured to correct the neglect resistance increase rate based on the neglect resistance elimination rate.

5. The charge control device according to claim 4, further comprising a neglect resistance increase rate storage unit that is configured to store a first corresponding relationship indicating how the SOC of the battery and the temperature of the battery are related to the neglect resistance increase rate, the first corresponding relationship being referred to by the neglect resistance increase rate calculation unit in obtaining the neglect resistance increase rate,
   wherein the first corresponding relationship is determined such that the neglect resistance increase rate becomes higher than in a state that is different in at least one of the SOC of the battery and the temperature of the battery from a first state where the SOC of the battery is confined within a predetermined high SOC region or a predetermined low SOC region and the temperature of the battery is confined within a predetermined first high temperature region, when the first state is established.

6. The charge control device according to claim 4, further comprising a neglect resistance elimination rate storage unit that is configured to store a second corresponding relationship indicating how the difference in the SOC of the battery and the temperature of the battery are related to the neglect resistance elimination rate, the second corresponding relationship being referred to by the neglect resistance elimination rate calculation unit in obtaining the neglect resistance elimination rate,     wherein the second corresponding relationship is determined such that the neglect resistance elimination rate becomes higher than in a state that is different in at least one of the difference in SOC of the battery and the temperature of the battery from a second state where the difference in SOC of the battery is confined within a predetermined high SOC difference region and the temperature of the battery is confined within a predetermined second high temperature region, when the second state is established.

\* \* \* \* \*